(12) United States Patent
Zhang et al.

(10) Patent No.: US 12,489,654 B2
(45) Date of Patent: Dec. 2, 2025

(54) SCENE SWITCHING

(71) Applicant: SHENZHEN TCL DIGITAL TECHNOLOGY LTD., Shenzhen (CN)

(72) Inventors: Yi Zhang, Shenzhen (CN); Xiaodong Zhao, Shenzhen (CN); Xiaofeng Liu, Shenzhen (CN); Tao Chen, Shenzhen (CN); Qinggang Luo, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 254 days.

(21) Appl. No.: 18/121,180

(22) Filed: Mar. 14, 2023

(65) Prior Publication Data
US 2023/0291601 A1 Sep. 14, 2023

Related U.S. Application Data

(63) Continuation of application No. PCT/CN2021/116320, filed on Sep. 2, 2021.

(30) Foreign Application Priority Data

Sep. 14, 2020 (CN) .......................... 202010965434.0

(51) Int. Cl.
*G10L 17/22* (2013.01)
*H04L 12/28* (2006.01)

(52) U.S. Cl.
CPC ............ *H04L 12/282* (2013.01); *G10L 17/22* (2013.01); *G05B 2219/2642* (2013.01)

(58) Field of Classification Search
CPC ....... G10L 17/22; G10L 15/22; H04L 12/282; H04L 12/2832
See application file for complete search history.

(56) References Cited

U.S. PATENT DOCUMENTS 8,837,898 B2 * 9/2014 Davidson ......... H04N 21/41407
386/230
8,954,597 B2 * 2/2015 Wong ...................... H04L 65/75
709/231

(Continued)

FOREIGN PATENT DOCUMENTS

CN 104601649 A 5/2015
CN 106850940 A 6/2017

(Continued)

OTHER PUBLICATIONS

PCT International Search Report for International Application No. PCT/CN2021/116320, mailed on Nov. 25, 2021, 6pp.

(Continued)

*Primary Examiner* — Daniel Abebe
(74) *Attorney, Agent, or Firm* — The Roy Gross Law Firm, LLC; Roy D. Gross

(57) ABSTRACT

A scene switching method includes: determining whether a user moves from a first scene to a second scene or not; if yes, acquiring voiceprint information of the user in the second scene; determining each device to be switched in the first scene according to the voiceprint information, and obtaining an operation state of the device to be switched; and determining an operation state of each target device in the second scene.

13 Claims, 4 Drawing Sheets

(56) References Cited

U.S. PATENT DOCUMENTS

| | | | | |
|---|---|---|---|---|
| 9,509,944 | B2* | 11/2016 | Micewicz | H04N 21/42201 |
| 11,514,898 | B2* | 11/2022 | Millington | H04R 27/00 |
| 2015/0286461 | A1* | 10/2015 | Trammell | H04N 21/8456 |
| | | | | 709/204 |
| 2015/0350590 | A1* | 12/2015 | Micewicz | H04N 5/775 |
| | | | | 386/230 |
| 2016/0277203 | A1 | 9/2016 | Jin et al. | |
| 2017/0242653 | A1* | 8/2017 | Lang | H04W 8/005 |
| 2019/0287522 | A1* | 9/2019 | Lambourne | G10L 15/22 |
| 2020/0275225 | A1 | 8/2020 | Proctor, Jr. et al. | |

FOREIGN PATENT DOCUMENTS

| | | |
|---|---|---|
| CN | 106878762 A | 6/2017 |
| CN | 107205217 A | 9/2017 |
| CN | 109597313 A | 4/2019 |
| CN | 110010127 A | 7/2019 |
| CN | 110674482 A | 1/2020 |
| CN | 110769280 A | 2/2020 |
| CN | 111312235 A | 6/2020 |
| CN | 112104533 A | 12/2020 |
| JP | 2002278639 A | 9/2002 |
| JP | 2018112600 A | 7/2018 |
| JP | 2019061334 A | 4/2019 |
| WO | 2020149031 A1 | 7/2020 |

OTHER PUBLICATIONS

PCT Written Opinion of the International Search Authority in International Application No. PCT/CN2021/116320, mailed on Nov. 25, 2021, 8pp.

Chinese Office Action issued in corresponding Chinese Patent Application No. 202010965434.0, pp. 1-8, 20pp.

Japanese Office Action issued in corresponding Japanese Patent Application No. 2023-516779, dated Apr. 1, 2025, pp. 1-5, 13pp.

Oona Ken et al. "New interface technology that transforms mobile communication styles", NTT Technology Journal, vol. 15, No. 9, pp. 66-70, Sep. 1, 2003.

* cited by examiner

SCENE SWITCHING

CROSS-REFERENCE TO RELATED APPLICATIONS

This application is a continuation of International Application No. PCT/CN2021/116320, filed on Sep. 2, 2021, which claims priority to Chinese Patent Application No. 202010965434.0, filed on Sep. 14, 2020. The disclosures of the aforementioned applications are incorporated herein by reference in their entireties.

TECHNICAL FIELD

The present disclosure relates to speech interaction, and more particularly, to scene switching.

BACKGROUND

With the development of far-field speech recognition technology, far-field devices are widely used. There may be a plurality of far-field devices in a user's home. When the user wakes up a far-field device through far-field speech, the far-field device will automatically operate according to parameters preset by the user or default parameters. For example, when the user is in a living room, a far-field device in the living room will be turned on upon receiving query wakeup words, such as "Little T, Little T" or the like, spoken by the user. When the user enters a bedroom from the living room and speaks again the query wakeup words "Little T, Little T", a far-field device in the bedroom will be turned on. However, since no cooperation relationship is established between the far-field devices in different scenes in the home, a far-field device in a new scene turned-on when the user enters the new scene will still operate according to the parameters preset by the user or the default parameters.

SUMMARY

In view of the above, an embodiment of the present disclosure provides a scene switching method, including the steps of:
  determining whether a user moves from a first scene to a second scene;
  in response to determining that a user moves from the first scene to the second scene, acquiring voiceprint information of the user in the second scene;
  determining one or more devices to be switched in the first scene based on the voiceprint information in the second scene, and obtaining respective first operation state information of the one or more devices to be switched; and
  determining respective second operation state information of one or more target devices in the second scene based on the respective first operation state information of the one or more devices to be switched,
  wherein the respective target devices match the one or more devices to be switched, respectively.

Another embodiment of the present disclosure provides a terminal including: a memory, a processor, and a scene switching program stored on the memory and running on the processor, wherein when executing the scene switching program, the processor is configured to:
  determine whether a user moves from a first scene to a second scene;
  in response to determining that a user moves from the first scene to the second scene, acquire voiceprint information of the user in the second scene;
  determine one or more devices to be switched in the first scene based on the voiceprint information in the second scene, and obtaining respective first operation state information of the one or more devices to be switched; and
  determine respective second operation state information of one or more target devices in the second scene based on the respective first operation state information of the one or more devices to be switched,
  wherein the respective target devices match the one or more devices to be switched, respectively.

Another embodiment of the present disclosure provides a computer readable storage medium having stored thereon a computer program is configured to, when executed by a processor, implement:
  determining whether a user moves from a first scene to a second scene;
  in response to determining that a user moves from the first scene to the second scene, acquiring voiceprint information of the user in the second scene;
  determining one or more devices to be switched in the first scene based on the voiceprint information in the second scene, and obtaining respective first operation state information of the one or more devices to be switched; and
  determining respective second operation state information of one or more target devices in the second scene based on the respective first operation state information of the one or more devices to be switched,
  wherein the respective target devices match the one or more devices to be switched, respectively.

DETAILED DESCRIPTION

It should be understood that specific embodiments described herein are merely intended to explain the present disclosure and are not intended to limit the present disclosure.

In a solution of an embodiment of the present disclosure, it is determined whether a user moves from a first scene to a second scene; if yes, voiceprint information of the user in the second scene is acquired; one or more devices to be switched in the first scene are determined according to the voiceprint information in the second scene, and respective first operation state information of the one or more devices to be switched is obtained; and respective second operation state information of one or more target devices in the second scene is determined according to the respective first operation state information of the one or more devices to be switched. The respective target devices match the one or more devices to be switched.

Since there is no cooperative relationship established between far-field devices in different scenes in the home, when the user enters a new scene of the different scenes, an enabled far-field device in the new scene still operate according to the parameters preset by the user or default parameters. In the present disclosure, in response to determining that the user moves from the first scene to the second scene, the voiceprint information of the user in the second scene is acquired; one or more devices to be switched in the first scene are determined according to the voiceprint information, and respective first operation state information of the one or more devices to be switched is obtained; the respective first operation state information of the one or more devices to be switched is sent to respective target devices in the second scene; and operation parameters corresponding to the operation state information are configured for the respective target devices. The operation parameters of the far-field devices are switched among different user scenarios through the cooperation relationship among the far-field devices.

Figure 1:
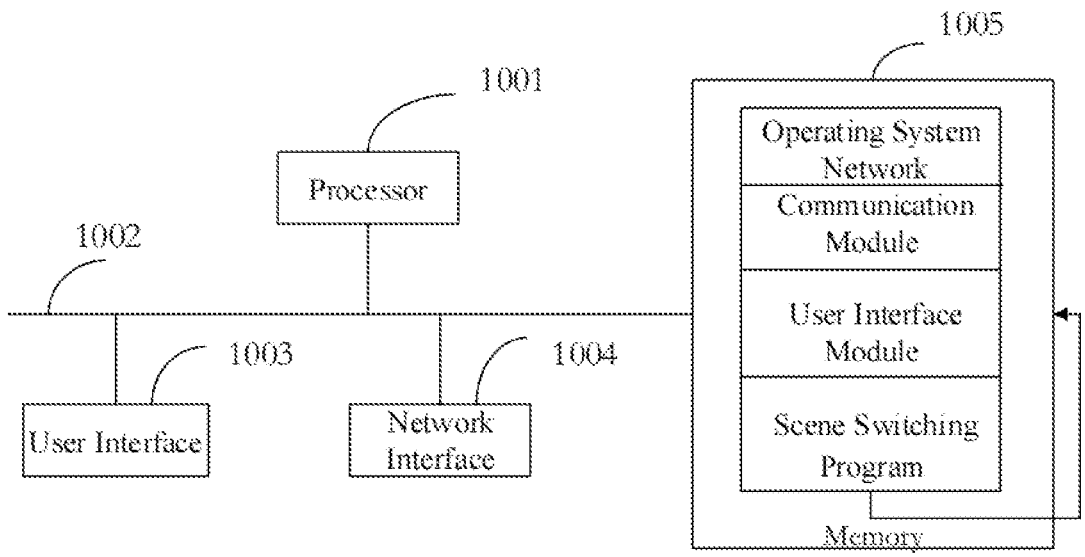
FIG. 1 is a schematic block diagram of a terminal according to an embodiment of the present disclosure.

As shown in FIG. 1, a terminal according to an embodiment of the present disclosure may include a processor 1001 such as a central processing unit (CPU), a network interface 1004, a user interface 1003, a memory 1005, and a communication bus 1002. The communication bus 1002 is configured to implement connection communication between these components. The user interface 1003 may include a display, or an input unit such as a Keyboard. Alternatively, the user interface 1003 may further include a standard wired interface, or a wireless interface. Alternatively, the network interface 1004 may include a standard wired interface, a wireless interface (e.g., a Wi-Fi interface). The memory 1005 may be a high-speed random access memory (RAM), or may be a non-volatile memory, such as a disk memory. Alternatively, the memory 1005 may further be a memory device independent of the afore mentioned processor 1001.

Alternatively, the terminal may further include a camera, a radio frequency (RF) circuit, a sensor, a remote control, an audio circuit, a Wi-Fi module, a detector, or the like. The terminal may be configured with other sensors such as a gyroscope, a barometer, a hygrometer, or a temperature sensor. Details are not described herein.

It will be appreciated by those skilled in the art that the termination structure shown in FIG. 1 does not limit the termination device, and the terminal may include more or less components than illustrated, or may combine certain components, or different component arrangements.

As shown in FIG. 1, a memory 1005 as a computer readable storage medium may include an operating system, a network communication module, a user interface module, and a scene switching program.

In the terminal shown in FIG. 1, the network interface 1004 is mainly configured to connect to the background server, for data communication with the background server. The user interface 1003 is mainly configured to connect to a client (a user side) and perform data communication with the client. The processor 1001 may be configured to invoke the scene switching program stored in the memory 1005, and perform the following operations:

determine whether a user moves from a first scene to a second scene;

if yes, acquire voiceprint information of the user in the second scene;

determine one or more devices to be switched in the first scene according to the voiceprint information in the second scene, and obtain respective first operation state information of the one or more devices to be switched; and determine respective second operation state information of one or more target devices in the second scene according to the respective first operation state information of the one or more devices to be switched.

The respective target devices match the one or more devices to be switched.

Figure 2:
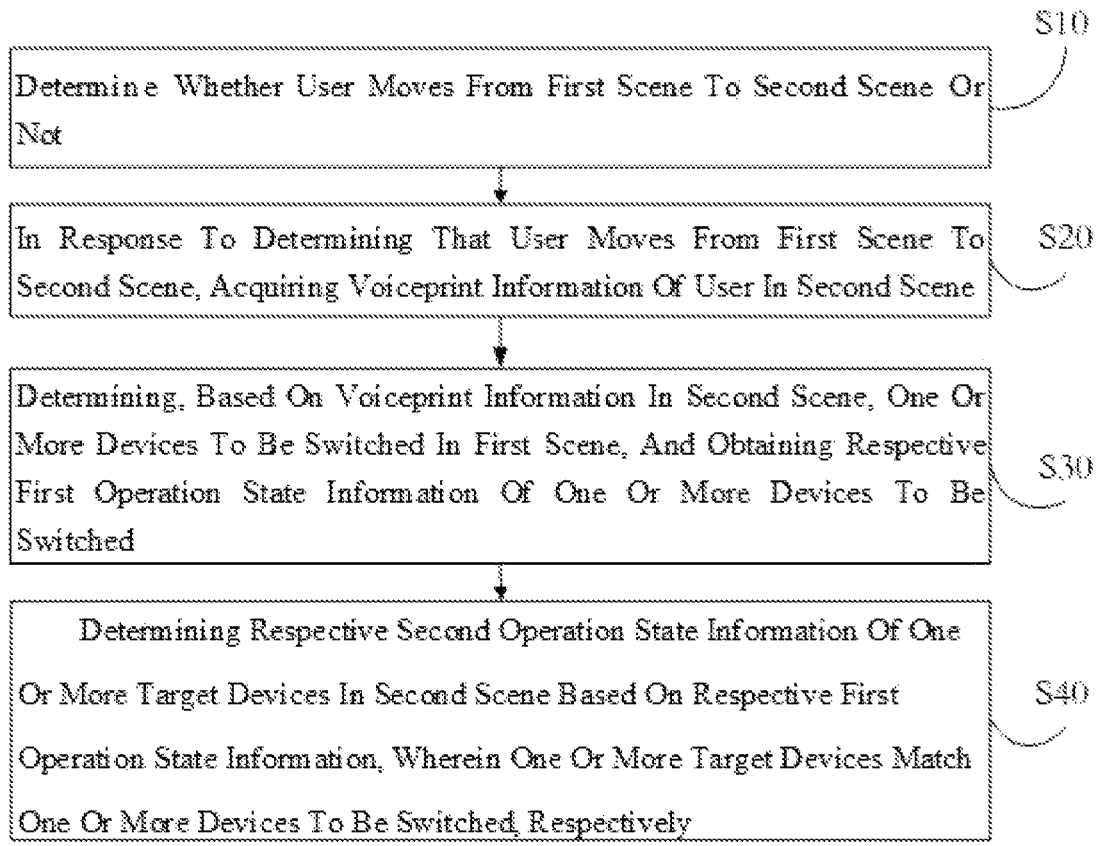
FIG. 2 is a schematic flowchart of a scene switching method according to a first embodiment of the present disclosure.

Referring to FIG. 2, a scene switching method according to a first embodiment of the present disclosure may include the following steps.

At Step S10, it is determined whether a user moves from a first scene to a second scene.

With the improvement of people's quality of life, more and more users prefer to place a plurality of far-field devices such as a sound box, an air conditioner, a television, or the like in the home. The plurality of far-field devices constitute a wireless speech interaction system. Typically, the user will select one of the far-field devices in the wireless speech interaction system as a master controlled device and other far-field devices as slave devices. The master device is connected to the slave devices wirelessly or via a wireless hotspot provided in the environment.

In the present embodiment, the scene includes, but is not limited to, a living room, a room (bedroom), a kitchen, or the like. The first scene refers to a scene the user was in before entering a current scene. The second scene refers to a scene in which the user is currently located.

Figure 5:
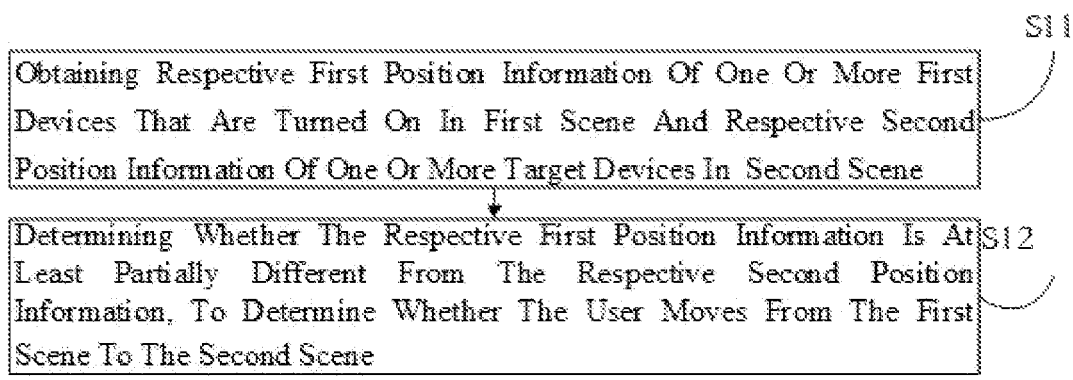
FIG. 5 is a schematic flowchart of the step of determining whether a user moves from a first scene to a second scene in a scene switching method according to an embodiment of the present disclosure.

Before performing the scene switching operation, it is necessary to first determine whether the scene in which the user is currently located changes. For example, a plurality of cameras are provided in different scenes, and the cameras are configured to shoot pictures/videos for the scene in which the user is located, and further obtain a device identifier for the scene from the shot pictures/videos. For example, the device identifier of the air conditioner in the living room is 01, and the device identifier of the air conditioner in the bedroom is 02. The device identifier may be set according to the needs of the user, which is not limited herein. Whether a scene in which the user is located changes is determined based on the device identification. The device identification is stored in advance in association with corresponding scene information. Alternatively, whether the user moves from the first scene to the second scene is determined based on positioning information for different scenes. In an embodiment, referring to FIG. 5, the step of determining whether the user moves from the first scene to the second scene includes:

Step S11: obtaining respective first position information of one or more first devices that are turned on in the first scene and respective second position information of the one or more target devices in the second scene; and Step S12: determining whether the respective first position information is at least partially different from the respective second position information.

Each of far-field devices in respective scenes includes a positioning module therein. When a far-field device(s) is enabled, the master device obtains a network identification parameter for the far-field device through a network connected to the far-field device, and obtains satellite positioning information for the far-field device based on a satellite positioning module of the far-field device. Further, position information for the far-field device is obtained according to the network identification parameter and the satellite positioning information, and a scene in which the user is currently located is determined according to the position information. The position information for respective enabled devices in the first scene and the position information for respective target devices in the second scene are obtained by using a same method. Further, determine whether the position information for the respective enabled devices are the same as the position information for the respective target devices, thereby determining whether the scene in which the user is located changes, that is, determining whether the user moves from the first scene to the second scene.

It should be noted that the target device is a wakeup device in the second scene, and the wakeup device refers to a device that has not obtained an operation parameter.

At Step S20, if it is determined that the user moves from the first scene to the second scene at Step S10, voiceprint information of the user in the second scene is acquired.

Figure 6:
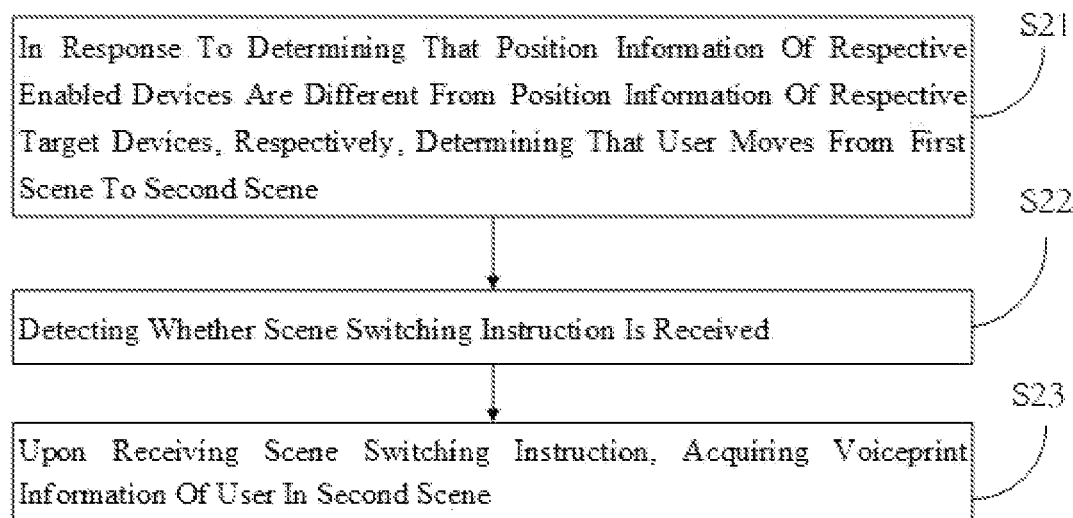
FIG. 6 is a schematic flowchart of the step of acquiring voiceprint information of the user in the second scene if it is determined that the user moves from the first scene to the second scene in a scene switching method according to an embodiment of the present disclosure.

Upon it is determined that the user moves from the first scene to the second scene, for example, that the user moves from the living room to the bedroom, detect, in real time, whether speech information from the user is received. Upon receiving the speech information from the user, the voiceprint information of the user in the bedroom is obtained based on the speech information. In an embodiment, referring to FIG. 6, the step of acquiring voiceprint information of the user in the second scene includes:

Step S21: in response to determining that the position information respectively corresponding to the enabled devices are different from the position information respectively corresponding to the respective target devices, respectively, determining that the user moves from the first scene to the second scene;

Step S22: detecting whether a scene switching instruction is received;

Step S23: upon receiving the scene switching instruction, acquiring the voiceprint information of the user in the second scene.

In response to determining that the position information respectively corresponding to the enabled devices in the first scene is different from the position information respectively corresponding to the target devices in the second scene, it indicates that the user moves from the first scene to the second scene. In response to determining that the position information for the respective enabled devices in the first scene is the same as the position information for the respective target devices in the second scene, it indicates that the user does not change the scene he is currently in. When the user enters the second scene, the slave device detects, in real time, whether receiving the scene switching instruction sent by the user through the far-field speech. Upon receiving the scene switching instruction sent by the user, the voiceprint information of the user in the second scene is further obtained. In particular, after the far-field device in the second scene is enabled, the speech signal in a working range of the slave device is detected in real time by a speech detection unit in the slave device. When a switching instruction "scene switching" sent by the user through the far-field speech is received, it is determined that the user needs to move from the first scene to the second scene, the speech information from the user corresponding to the scene switching instruction is obtained, voiceprint recognition is performed on the speech information so that feature information of the voiceprint is extracted, and the voiceprint information of the user is obtained based on the feature information of the voiceprint.

Further, a far-field device(s) in the second scene is enabled based on the far-field control instruction sent by the user. In particular, when the user moves from the first scene to the second scene, the slave device detects the speech signal in the working range of the slave device in real time through the built-in speech detection unit. Upon receiving the wakeup word "Little T, Little T" sent by the user through the far-field speech, a plurality of the far-field devices in this scene are enabled. Said wakeup word is preset by the user according to his needs and is not limited here. Once the wakeup word is detected by the slave device, a speech wakeup process is carried out to wake up an algorithm unit in the standby state. After said algorithm unit is woken up, i.e. after said algorithm unit switches from the standby state to an active state, the speech detection unit transmits the obtained speech signal to the algorithm unit. Accordingly, said algorithm unit may carry out arithmetic processing on the obtained speech signal in a predetermined manner (the arithmetic processing includes echo cancellation, reverberation cancellation, sound source location, or the like), and finally obtain a clear speech signal, which will be transmitted to a control system of an intelligent device. The control system of the intelligent device uploads the obtained speech signal to the server/cloud, so that the server/cloud performs speech recognition on the obtained speech signal, generates a respective enable instruction according to a speech recognition result, and returns the respective enable instruction to the control system of the intelligent device. The control system of the intelligent device enables the far-field device in the scene according to the enable instruction.

Alternatively, the speech detection unit may be a low-power microphone unit with a wakeup function. "low-power" means that the power consumption of the microphone unit is very low. By using such a microphone unit, energy consumption can be saved. In addition, the microphone unit may be a microphone array including at least two microphones, and a plurality of microphones may be used to improve the acquisition sensitivity of the microphone unit to a speech signal. For example, three microphones may be disposed at the left, middle, and right positions below the far-field device, respectively, so that a speech signal transmitted from the user is well obtained, regardless of the user located in the front, left or right positions of the far-field device. When the wakeup word is detected by any of the microphones in the microphone array, the algorithm unit in a standby state may be woken up. For example, when the wakeup word is detected by any microphone, a wakeup signal (interrupt signal) may be sent from any microphone to the algorithm unit, so that the algorithm unit is activated to perform operation functions such as the echo cancellation, the reverberation cancellation, the sound source location, or the like.

At Step S30, one or more devices to be switched in the first scene according to the voiceprint information are determined, and respective first operation state information of the one or more devices to be switched are obtained.

In the present embodiment, the operation state information includes an on state, an off state, a recovery state, or the like. The operation state information is different for different devices. For example, the operation state information of an air conditioner includes a refrigeration operation state, a heating operation state, a dehumidification operation state, or a defrost operation state. The operation state information of a fan includes a natural wind operation mode, an operation state of a wind speed gear, a timing or not, or the like.

Figure 7:
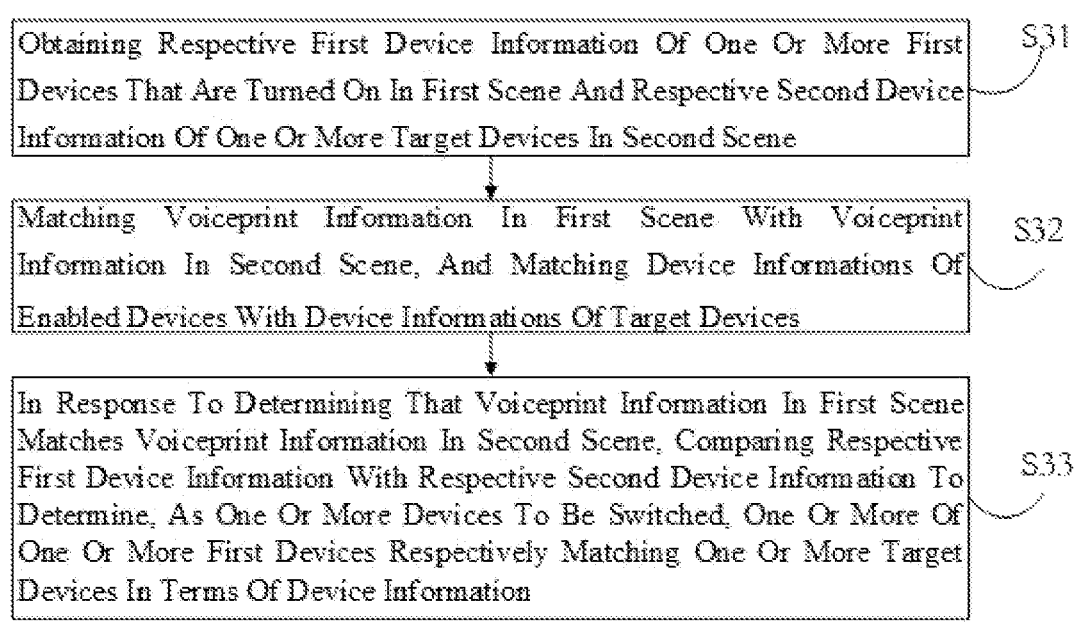
FIG. 7 is a schematic flowchart of the step of determining one or more devices to be switched in a first scene according to voiceprint information in a scene switching method according to an embodiment of the present disclosure.

The master device determines respective enabled devices in the first scene according to the voiceprint information, and further obtains, from the storage module, the operation state information respectively corresponding to the enabled devices in the first scene. For example, when the master device receives an obtain instruction for the operation state information of the enabled devices, the state information respectively corresponding to the enabled devices in the first scene are obtained from the storage module based on the obtain instruction, and the obtained state information is sent to the master device for storage. The obtain instruction is triggered in response to the master device receiving the voiceprint information from a user in the second scene, and the state information is obtained by performing data acquisition on the respective enabled far-field devices by the slave device through the data acquisition module. Further, the state information of the respective enabled devices in the first scene matches the respective second device information of the one or more target devices in the second scene. The one or more devices to be switched in the first scene is determined based on the matching operation, and the respective first operation state information of the one or more devices to be switched are obtained. Therefore, referring to FIG. 7, the step of determining the one or more devices to be switched in the first scene according to the voiceprint information includes:

Step S31: obtaining device information respectively corresponding to the enabled devices in the first scene and device information respectively corresponding to the target devices in the second scene;

Step S32: matching voiceprint information in the first scene with the voiceprint information in the second scene, and comparing the respective first device information with the respective second device information;

Step S33: in response to determining that the voiceprint information in the first scene matches the voiceprint information in the second scene, obtaining at least one enabled device matching the target devices from the enabled devices, and determining the at least one enabled device matching the target devices as the one or more devices to be switched in the first scene.

When obtaining device information respectively corresponding to the enabled devices in the first scene and device information respectively corresponding to the target devices in the second scene, the master device first matches the voiceprint information in the first scene with the voiceprint information in the second scene. In response to determining that the voiceprint information in the first scene is not matching the voiceprint information in the second scene, it indicates that the user who enables the far-field device in the first scene is not the same person as the user who wakes up the far-field device in the second scene. Therefore, the speech prompt information needs to be sent to prompt the user that the current voiceprint information does not match. In response to determining that the voiceprint information in the first scene matches the voiceprint information in the second scene, the master device further matches the respective first device information with the respective second device information. The device information includes a device type, a device capability, a device use time, or the like. In response to determining that the respective first device information are not matching the respective second device information, the speech prompt information is sent to prompt the user to confirm the scene to be converted currently. In response to determining that the respective first device information are matched, or partially matched, with the respective second device information, at least one enabled device matching the target devices is obtained from the enabled devices, and the at least one enabled device matching the target devices is determined as the to-be-switched device in the first scene. During the matching is performed, the enabled device in the first scene and the wakeup device in the second scene are matched. For example, in the first scene, the enabled device includes an air conditioner, a television, a lamp, a sound, or the like, and in the second scene, the wakeup device includes an air conditioner, a lamp, and a sound, so that the air conditioner, the lamp, or the sound in the first scene match the second scene. If all the devices meet the matching conditions, it is determined that the air conditioner, the lamp tube and the sound are the one or more devices to be switched in the first scene. Further, the respective first operation state information of the one or more devices to be switched are further obtained from the storage module of the master controlled device. The storage module of the master device stores the operation state information corresponding to each of the enabled devices in the first scene, as shown in Table 1.

TABLE 1

| Device Name | Work State | Operation Status and Operation Parameter |
| --- | --- | --- |
| Air Conditioner | Enabled | Refrigeration operation (26° C.); wind speed gear (intermediate gear); start-up of dehumidification |
| Fan | Enabled | Operation mode (natural wind); Wind speed gear (intermediate gear); Swinging mode (swinging left and right) |
| Lamp tube | Enabled | Brightness gear (midrange); Light mode (soft light mode) |
| Sound | Enabled | Volume level (60%); Play mode (Bluetooth play mode) |

In Table 1, only the storage of some device information is listed. The device information further includes other operation states and operation parameters, which are not listed here.

From Table 1, the operation state and the operation parameter information (i.e., the operation parameter) corresponding to each of the one or more devices to be switched in the first scene may be obtained. For example, the air conditioner is in the refrigeration mode, the operation refrigeration temperature is 26° C., the wind speed gear is at the middle gear, and the dehumidification mode is started. The current luminance gear of the lamp tube is the middle gear, and the light mode is the soft light mode. The sound volume is adjusted to 60% and the play mode is Bluetooth play mode.

Figure 8:
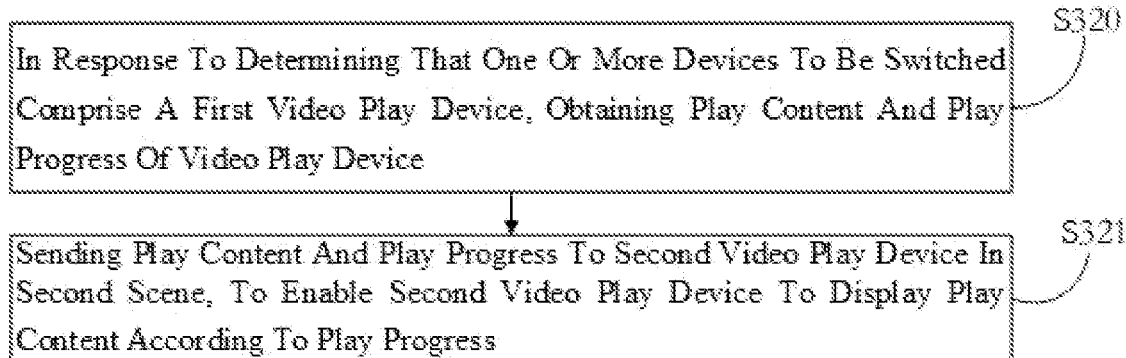
FIG. 8 is a schematic flowchart of operations after the step of determining one or more devices to be switched in the first scene in a scene switching method according to an embodiment of the present disclosure.

Further, when the to-be-switched device in the first scene has a video play device, play content and play progress of the video play device need to be recorded. Therefore, referring to FIG. 8, the method may further include Steps S320-S321 after the above Step S33.

Step S320: in response to determining that a video play device is included in the one or more devices to be switched in the first scene, obtaining play content and play progress of the video play device;

Step S321: sending the play content and the play progress to a video play device in the second scene, so that the video play device in the second scene displays the play content according to the play progress.

If the master device detects that the video playing device such as a television is in the to-be-switched device in the first scene, the main control device obtains the current play content and the play progress information of the television, and sends the previous play content and the play progress information to the television in the second scene when the scene switching operation is executed, so that the television in the second scene displays the play content according to the play progress. For example, the television in the first scene is playing the contents of the Chinese Women's Volleyball receiving the award after winning the championship in the CCTV-5 Sports Channel, and the play progress is the second minute of the award in progress. After the scene switching is performed, the television in the second scene also plays the contents of the Chinese Women's Volleyball receiving the award after winning the championship in the CCTV-5 Sports Channel, and the play starts from the second minute of the award in progress.

At Step S40, respective second operation state information of one or more target devices in the second scene are determined according to the respective first operation state information of the one or more devices to be switched. Herein, the respective target devices match the one or more devices to be switched, respectively.

Figure 9:
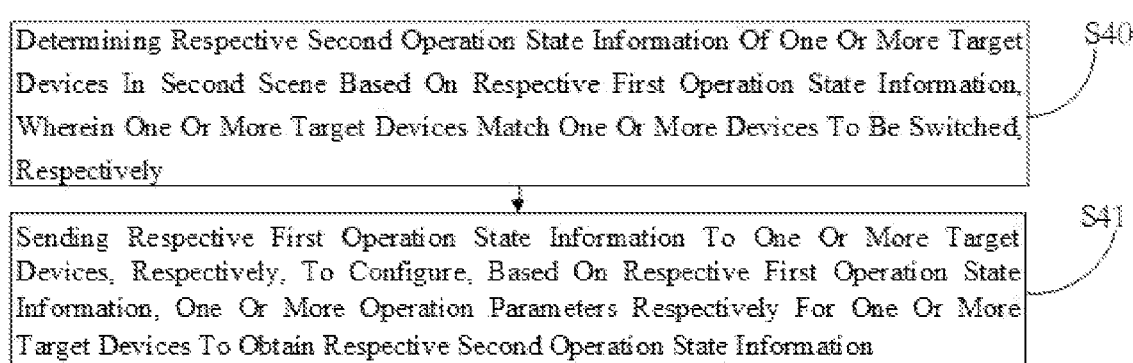
FIG. 9 is a schematic flowchart of operations after the step of determining respective second operation state information of one or more target devices in a second scene according to operation state information respectively corresponding to one or more devices to be switched in a first scene in a scene switching method according to an embodiment of the present disclosure.

In the present embodiment, determine the respective second operation state information of one or more target devices in the second scene according to the respective first operation state information of the one or more devices to be switched in the first scene. The matching of respective target devices with the one or more devices to be switched means that a device type, a device capability, a device use time, or the like of each of the target devices match that of the respective to-be-switched device. Specifically, the master device determines the respective second operation state information of one or more target devices according to the operation parameters in the respective first operation state information of the one or more devices to be switched in the first scene. In an embodiment, referring to FIG. 9, the method may further include Step S41 after the above Step S40.

At Step S41, the respective first operation state information of the one or more devices to be switched are sent to the respective target devices in the second scene, and the operation parameters corresponding to the operation state information are configured for the respective target devices.

The master device obtains a corresponding operation parameter according to the respective first operation state information of the one or more devices to be switched in the first scene. The operation parameter includes an operation condition parameter and an operation state parameter. For example, the operation condition parameter of the air conditioner includes some or all of an operation mode, a start-up temperature, an indoor temperature and an outdoor temperature, and the operation state parameter includes some or all of an exhaust temperature, an operation current, an exhaust pressure, an evaporation temperature and a condensation temperature.

The master device distributes the obtained operation parameters respectively corresponding to the one or more devices to be switched to the respective waken devices respectively corresponding to the one or more devices to be switched in the second scene. After receiving the operation parameters, the respective waken devices in the second scene sets the current operation according to the operation parameters. For example, it is currently obtained that: the operation cooling temperature of the to-be-switched air conditioner in the first scene is 26° C., the wind speed is medium, and the wind sweeping mode is up-down sweeping; the to-be-switched lamp tube is in a warm light mode, and the brightness gear is a middle gear; and the wind speed of the to-be-switched fan is three gears, and the swinging mode is left-right swinging. The obtained operation parameters of the to-be-switched air conditioner, the to-be-switched lamp tube, and the to-be-switched fan is send to the respective target devices in the second scene, so that the operation cooling temperature of the air conditioner in the second scene is 26° C., the air speed is medium, and the air sweeping mode is up-down sweeping; the lamp tube is in a warm light mode, and the brightness gear is a middle gear; and the wind speed of the fan is three gears, and the swinging mode is left-right swinging.

Figure 10:
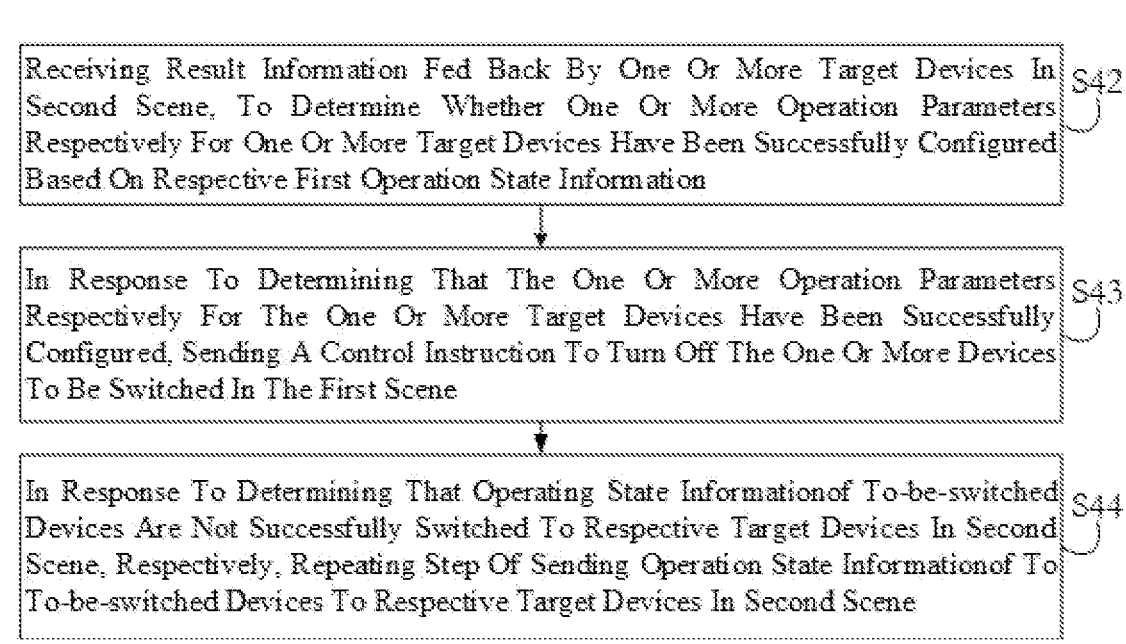
FIG. 10 is a schematic flowchart of operations after the step of sending operation state information respectively corresponding to one or more devices to be switched to respective target devices in a second scene and configuring operation parameters corresponding to operation state information for respective target devices in a scene switching method according to an embodiment of the present disclosure.

Further, referring to FIG. 10, the method may further include Steps S42-S44 after the above Step S41.

At Step S42, result information fed back by the respective target devices in the second scene is received, and whether the respective first operation state information of the one or more devices to be switched in the first scene is successfully switched to the respective target devices in the second scene is determined, respectively, based on the result information.

At Step S43, in response to determining that the respective first operation state information of the one or more devices to be switched are successfully switched to the respective target devices in the second scene, a control instruction is sent to disable the one or more devices to be switched in the first scene.

At Step S44, in response to determining that the respective first operation state information of the one or more devices to be switched are not successfully switched to the respective target devices in the second scene, the step of sending the respective first operation state information of the one or more devices to be switched to the respective target devices in the second scene is repeated.

After the scene switching operation is performed, the respective waken devices in the second scene sends the result information of the operation parameter switching to the master controlled device, where the result information includes the operation status information, the operation parameter information, or the like of the respective waken devices. The master device determines, based on the received result information, whether the respective first operation state information of the one or more devices to be switched in the first scene is successfully switched to the respective target devices in the second scene. For example, the master device determines whether the respective first operation state information of the one or more devices to be switched in the first scene is the same as the operation state information respectively corresponding to the target devices in the second scene. In response to determining that the operation state information respectively corresponding to the one or more devices to be switched are the same as the operation state information respectively corresponding to the target devices in the second scene, it indicates that the respective first operation state information of the one or more devices to be switched in the first scene are successfully switched to the respective target devices in the second scene, and the main control device needs to send a control instruction to close the one or more devices to be switched in the first scene. If not, it indicates that the respective first operation state information of the one or more devices to be switched are not successfully switched to the respective target devices in the second scene, and then the step of sending the respective first operation state information of the one or more devices to be switched to the respective target devices in the second scene is repeated.

It should be noted that before the scene switching is performed, a setting-up condition of the scene needs to be determined, and the setting-up of the scene includes the following conditions:
1. providing a plurality of far-field devices;
2. identifying a far-field device using a lightweight protocol such as mDNS (multicast Domain Name System), UPnP (Universal Plug and Play), or the like, and defining a master device and a slave device in a home, wherein the master device includes a storage module for storing voiceprint information, device information, scene information, or the like transmitted from the slave device, and a matching module for matching the voiceprint information and the device information in the first scene with that in the second scene, and the slave device include devices such as an intelligent air conditioner, an intelligent television, an intelligent fan, an intelligent sound, or the like;
3. establishing a UDP (User Datagram Protocol) connection between the master device and the slave device, and detecting the connection between the master device and the slave device through a heartbeat packet, wherein the UDP is a user datagram protocol, and a connectionless transport layer protocol in the OSI (Open System Interconnection) reference model, for providing a transaction-oriented simple and reliable information transfer service.
4. performing location registration and scene division for each device, according to the types of wakeup devices in the plurality of far-field devices or supplemented by a user; and
5. setting a scene switching wakeup statement and a scene switching statement for a far-field device, such as "Little T, Little T", "scene switching" or the like.

In the present disclosure, in response to determining that the user moves from the first scene to the second scene, acquire the voiceprint information of the user in the second scene; determine one or more devices to be switched in the first scene according to the voiceprint information, and obtain respective first operation state information of the one or more devices to be switched; send the respective first operation state information of the one or more devices to be switched to respective target devices in the second scene; and configure operation parameters corresponding to the operation state information for the respective target devices.

By establishing a collaboration relationship between the far-field devices, switching of operation parameters for the far-field devices among different user scenes is realized. In addition, by sending far-field speech to automatically start a far-field device, operation complexity for the users is reduced, intelligent sensing and intelligent collaboration of the far-field devices are realized, and a more comfortable and convenient home environment is brought to the users.

Figure 3:
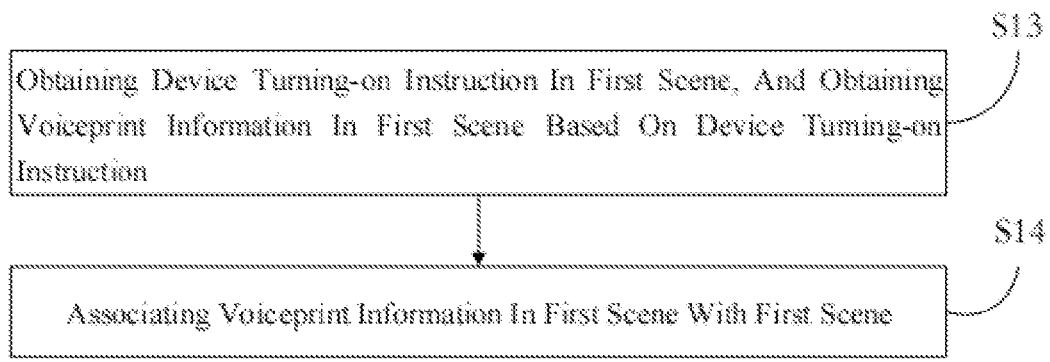
FIG. 3 is a schematic flowchart of a scene switching method according to a second embodiment of the present disclosure.

Further, referring to FIG. 3, a scene switching method according to a second embodiment of the present disclosure is provided.

The second embodiment of the scene switching method differs from the first embodiment of the scene switching method in that the method further includes, before the step of determining whether the user moves from the first scene to the second scene:

Step S13: obtaining a device turning-on instruction in the first scene, and obtaining voiceprint information in the first scene according to the device turning-on instruction; and Step S14: associating the voiceprint information in the first scene with the first scene.

When receiving a wakeup word "Little T, Little T" sent by a user through a far-field speech, a slave device wakes up a plurality of far-field devices in a first scene according to the wakeup word, and configures an operation parameter for each of the wakened far-field devices, respectively, so as to start each of the wakened far-field devices. Further, the master device obtains information such as a device capability and a device status corresponding to each of the enabled devices. At the same time, the obtained user speech is preprocessed, a non-speech signal and a silent speech signal are removed, a preprocessed speech is obtained, then the preprocessed speech is framed, the Mel-frequency cepstrum coefficient (MFCC) for each frame of the speech signal is extracted and stored. Specifically the method includes the steps of: pre-enhancement: i.e. performing differential on the speech signal; tone framing: framing of the speech data; hamming window: adding a window to each frame to reduce the effect of the Gibbs effect; Fast Fourier transformation: transforming a time domain signal into a power spectrum of the signal; triangular bandpass filter: the triangular filter covers an area all approximating a critical bandwidth of the human ear as a way to simulate masking effect of the human ear; discrete cosine transformation: removing the correlation between the signals in each dimension and mapping the signal to a lower dimensional space. Further obtaining speech dynamic characteristic parameters from the extracted MFCC parameters as voiceprint characteristic information for the user, thereby obtaining the voiceprint information of the user in the first scene.

The slave device associates the obtained voiceprint information in the first scene with the first scene. For example, the scene in which the current user is located is a living room, and the slave device binds the currently obtained voiceprint information in the living room to the scene (i.e., the living room), so that when the user enters another scene, the scene in which the user is previously located may be known as the living room based on the voiceprint information in the first scene. Alternatively, the voiceprint information may also be associated with personal information of the user. For example, for each family member in the family such as grandpa, grandma, father, mother, and children, his/her user information and user voiceprint characteristic information are acquired respectively, and the user information may also be associated with the user voiceprint characteristic information. For example, the user information of father may also be associated with the user voiceprint characteristic information of father. Further, the master device obtains the voiceprint information transmitted from the slave device and the information bound to the scene (e.g., the living room scene plus the voiceprint object), and the device status information in the scene, and stores the obtained information to the corresponding storage unit.

In the present embodiment, the voiceprint information in the first scene is associated with the first scene, so that when the voiceprint information in the first scene is obtained, the scene information corresponding to the voiceprint information is simultaneously obtained.

Figure 4:
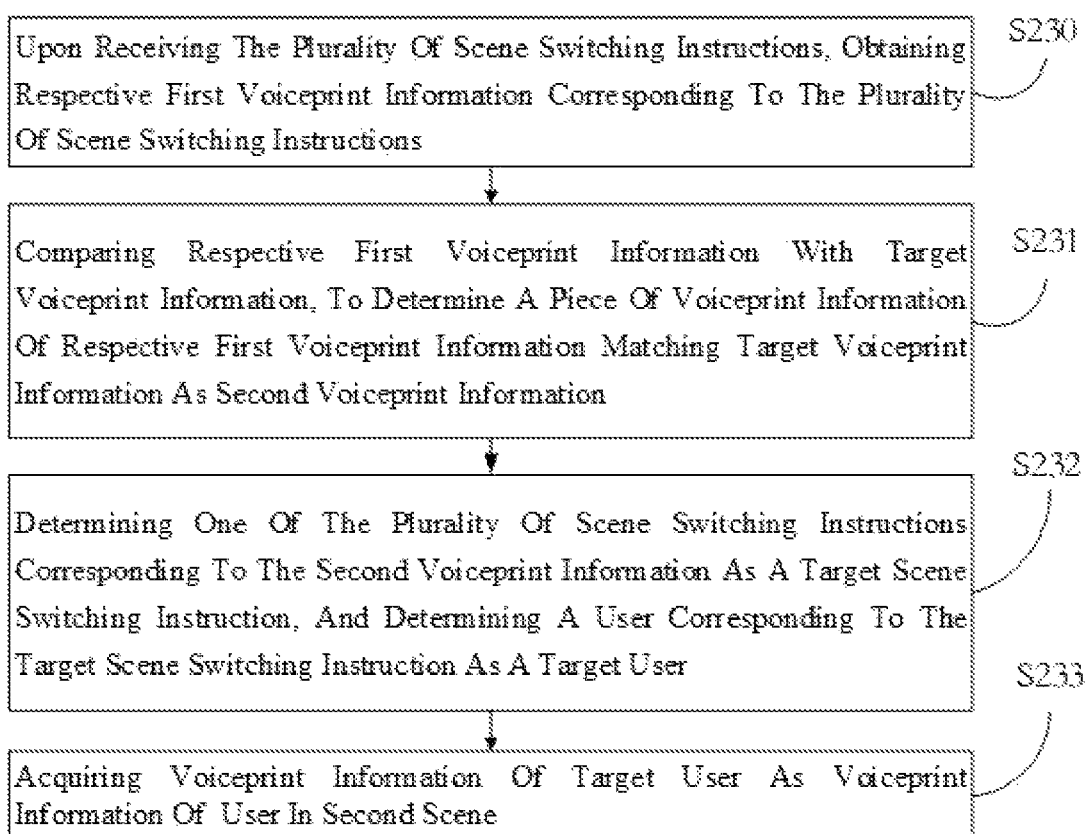
FIG. 4 is a schematic flowchart of a scene switching method according to a third embodiment of the present disclosure.

Further, referring to FIG. 4, a scene switching method according to a third embodiment of the present disclosure is provided.

The third embodiment of the scene switching method differs from the first embodiment and the second embodiment of the scene switching method in that: the step of acquiring the voiceprint information of the user in the second scene upon receiving the scene switching instruction includes:

Step S230: upon receiving a plurality of scene switching instructions, obtaining respective first voiceprint information corresponding to the plurality of scene switching instructions;

Step S231: matching the respective first voiceprint information corresponding to the plurality of scene switching instructions with target voiceprint information, to obtain the voiceprint information matching the target voiceprint information;

Step S232: in response to determining that the voiceprint information matching the target voiceprint information exists in the respective first voiceprint information corresponding to the scene switching instructions, determining that one or more scene switching instructions corresponding to the voiceprint information matching the target information is a target scene switching instruction, and that the user corresponding to the target scene switching instruction is a target user; and Step S233: acquiring a scene switching instruction from the target user as the voiceprint information of the user in the second scene.

When a plurality of users send a plurality of scene switching instructions "scene switching" through far-field speech at the same time, a slave device sends the plurality of scene switching instructions to the master controlled device, the master device extracts voiceprint information of the users from speech information respectively corresponding to the scene instructions, and the master device sequentially matches the extracted speech print information with the target speech print information, respectively. If voiceprint information matching the respective target voiceprint information exists in respective first voiceprint information corresponding to the scene switching instructions, the scene switching instruction corresponding to the voiceprint information matching the target information is determined as the target scene switching instruction, and a user corresponding to the target scene switching instruction as the target user. A scene switching instruction of the target user is obtained and used as voiceprint information of the user in the second scene.

Alternatively, a registration voiceprint library may be constructed in advance, and different users may register their own speech in advance. For example, a registered user performs speech registration in a setting interface of an intelligent device, and transmits speech within a range where the intelligent device can acquire speech. After acquiring speech of the registered user, the intelligent device extracts registration voiceprint feature information according to the speech of the registered user by using a voiceprint model, and stores the registration voiceprint feature information of the registered user in the registration voiceprint library. The voiceprint model is pre-constructed, and parameters of extracted voiceprint feature information are the same for different users' speech. In addition, the speech transmitted by the user may be any sentence or a specified sentence, and the specific content of the speech is set by the user. By constructing the registration voiceprint library, the voiceprint characteristic information of the target user may be quickly obtained. Meanwhile, whether the received voiceprint information of the plurality of users are stored in the voiceprint library in advance or not may be further queried. If the received voiceprint information are stored in the voiceprint library in advance, the voiceprint characteristic information corresponding to a voiceprint information is directly obtained. A comparison operation of the voiceprint characteristic information with the target voiceprint characteristic information is performed, so that the target user may be quickly determined, and a time of a matching operation is shortened.

In the present embodiment, when receiving scene switching instructions sent by a plurality of users, respective first voiceprint information corresponding to the scene switching instructions are obtained, and a target user corresponding to the target scene switching instruction is determined by matching the respective first voiceprint information corresponding to the scene switching instructions with the respective target voiceprint information, so that the voiceprint information corresponding to the target user may be obtained in time.

In addition, in an embodiment of the present disclosure, a terminal is further provided. The terminal includes a memory, a processor and a program for switching a scene stored in the memory and running on the processor. Upon receiving a device turning-on instruction sent by a user through a far-field speech, the terminal enables a plurality of far-field devices in a home based on the device turning-on instruction, determines a scene in which the user is currently located according to position information respectively corresponding to the enabled far-field devices, and further obtains voiceprint information of the user in the scene and device information respectively corresponding to the enabled devices (such as an operation parameter, a device type and a device capability of a device). When a user moves from the first scene to the second scene, if a scene switching instruction sent by the user through a far-field speech is received, voiceprint information of the user in the second scene and device information respectively corresponding to the wakeup devices are obtained. The voiceprint information in the first scene match the voiceprint information in the second scene, respectively, and the respective first device information match the respective second device information, respectively, to determine the one or more devices to be switched in the first scene. The respective first operation state information of the one or more devices to be switched are sent to the respective target devices in the second scene, and the operation parameters corresponding to the operation state information are configured for the respective target devices. In the present embodiment, user scenes are switched by sending a far-field speech, so that operation complexity for the user is reduced, intelligent sensing and intelligent cooperation of the far-field device are realized, and a more comfortable and convenient home environment is brought to the user.

In addition, in the present disclosure, provided is a computer readable storage medium having stored thereon a computer program which, when executed by a processor, implements the steps of the above scene switching method.

Those skilled in the art will appreciate that embodiments of the present disclosure may be implemented as a method, system, or computer program product. Thus, embodiments of the present disclosure may be implemented in the form of a full hardware embodiment, a full software embodiment, or an embodiment incorporating both software and hardware. Furthermore, the present disclosure may be implemented in the form of a computer program product embodied on one or more computer usable storage media (including, but not limited to, magnetic disk memory, CD-ROM, optical memory, etc.) having computer usable program code embodied therein.

Embodiments of the present disclosure are described with reference to flow charts and/or block diagrams of methods, devices (systems), and computer program products according to embodiments of the present disclosure. It is to be understood that each step and/or block (or module) in the flow charts and/or block diagrams, and combinations of the step and/or the block in the flow charts and/or the block diagrams may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device generate means for implementing the functions specified in one or more steps in the flowchart and/or one or more blocks in the diagram block.

These computer program instructions may also be stored in a computer-readable memory capable of directing the computer or other programmable data processing device to operate in a particular manner, such that the instructions stored in the computer-readable memory generate an article of manufacture including instruction means that perform the functions specified in one or more steps in the flowchart and/or one or more blocks in the diagram block.

These computer program instructions may also be loaded onto a computer or other programmable data processing device, such that a series of operational steps are performed on the computer or other programmable device to generate a computer-implemented process, such that the instructions that execute on the computer or other programmable device provide steps for implementing the functions specified in one or more steps in the flowchart and/or one or more blocks in the diagram block.

It should be noted that in the claims, any reference signs between parentheses shall not be construed as limiting the claims. The word "include/comprise" does not rule out there are elements or steps not listed in the claims. The word "one" or "a/an" before a component does not preclude the existence of more than one such component. The present disclosure may be implemented by means of hardware comprising several distinct components and by means of a suitably programmed computer. In the unit claims enumerating several means, some of these means may be embodied by the same item of hardware. The use of the words "first", "second", "third", etc., does not denote any order. These words can be interpreted as names.

It will be apparent to those skilled in the art that various modifications and variations can be made to the present disclosure without departing from the spirit and scope of the present disclosure. Such modifications and variations are intended to fall within the scope of the present disclosure.

What is claimed is:

1. A scene switching method, comprising:
   determining, by a processor of a terminal, whether a user moves from a first scene to a second scene;
   in response to determining that the user moves from the first scene to the second scene, acquiring, by the processor of the terminal, voiceprint information of the user in the second scene;
   determining, by the processor of the terminal, based on the voiceprint information in the second scene, one or more devices to be switched in the first scene, and obtaining, by the processor of the terminal, respective first operation state information of the one or more devices to be switched; and
   determining, by the processor of the terminal, respective second operation state information of one or more target devices in the second scene based on the respective first operation state information,
   wherein the one or more target devices match the one or more devices to be switched, respectively;
   wherein the determining of the one or more devices to be switched comprises:
   obtaining, by the processor of the terminal, respective first device information of one or more first devices that are turned on in the first scene and respective second device information of the one or more target devices in the second scene; and
   in response to determining that voiceprint information in the first scene matches the voiceprint information in the second scene, comparing, by the processor of the terminal, the respective first device information with the respective second device information to determine, as the one or more devices to be switched, one or more of the one or more first devices respectively matching the one or more target devices in terms of device information;
   wherein the determining of the respective second operation state information based on the respective first operation state information comprises:
   sending, by the processor of the terminal, the respective first operation state information to the one or more target devices, respectively, to configure, based on the respective first operation state information, one or more operation parameters respectively for the one or more target devices to obtain the respective second operation state information;
   after sending the respective first operation state information to the one or more target devices, respectively, to configure the one or more operation parameters respectively for the one or more target devices,
   receiving, by the processor of the terminal, result information fed back by the one or more target devices in the second scene, to determine whether the one or more operation parameters respectively for the one or more target devices have been successfully configured based on the respective first operation state information;
   in response to determining that the one or more operation parameters respectively for the one or more target devices have been successfully configured, sending, by the processor of the terminal, a control instruction to turn off the one or more devices to be switched in the first scene.

2. The scene switching method of claim 1, wherein the determining of whether the user moves from the first scene to the second scene comprises:

obtaining respective first position information of one or more first devices that are turned on in the first scene and respective second position information of the one or more target devices in the second scene; and determining whether the respective first position information is at least partially different from the respective second position information, to determine whether the user moves from the first scene to the second scene.

3. The scene switching method of claim 1, wherein the acquiring of the voiceprint information of the user in the second scene comprises:

upon receiving one or more scene switching instructions, acquiring the voiceprint information of the user in the second scene.

4. The scene switching method of claim 1, further comprising: before determining whether the user moves from the first scene to the second scene, obtaining a device turning-on instruction in the first scene, and obtaining voiceprint information in the first scene based on the device turning-on instruction; and associating the voiceprint information in the first scene with the first scene.

5. The scene switching method of claim 3, wherein the one or more scene switching instructions comprise a plurality of scene switching instructions;

the acquiring of the voiceprint information of the user in the second scene upon receiving the one or more scene switching instructions comprises:

upon receiving the plurality of scene switching instructions, obtaining respective first voiceprint information corresponding to the plurality of scene switching instructions;

comparing the respective first voiceprint information with target voiceprint information, to determine a piece of voiceprint information of the respective first voiceprint information matching the target voiceprint information as second voiceprint information;

determining one of the plurality of scene switching instructions corresponding to the second voiceprint information as a target scene switching instruction, and determining a user corresponding to the target scene switching instruction as a target user; and acquiring voiceprint information of the target user as the voiceprint information of the user in the second scene.

6. The scene switching method of claim 1, further comprising: after comparing the respective first device information with the respective second device information to determine, as the one or more devices to be switched, the one or more of the one or more first devices, in response to determining that the one or more devices to be switched comprise a first video play device, obtaining play content and play progress of the video play device; and sending the play content and the play progress to a second video play device in the second scene, to enable the second video play device to display the play content according to the play progress.

7. A terminal comprising:

a processor; and a memory storing thereon a program executable by the processor to perform operations comprising:

determining, by the processor of the terminal, whether a user moves from a first scene to a second scene;

in response to determining that the user moves from the first scene to the second scene, acquiring voiceprint information of the user in the second scene;

determining, by the processor of the terminal, based on the voiceprint information in the second scene, one or more devices to be switched in the first scene, and obtaining, by the processor of the terminal, respective first operation state information of the one or more devices to be switched; and determining, by the processor of the terminal, respective second operation state information of one or more target devices in the second scene based on the respective first operation state information, wherein the one or more target devices match the one or more devices to be switched, respectively;

wherein the determining of the one or more devices to be switched comprises:

obtaining, by the processor of the terminal, respective first device information of one or more first devices that are turned on in the first scene and respective second device information of the one or more target devices in the second scene; and in response to determining that voiceprint information in the first scene matches the voiceprint information in the second scene, comparing, by the processor of the terminal, the respective first device information with the respective second device information to determine, as the one or more devices to be switched, one or more of the one or more first devices respectively matching the one or more target devices in terms of device information;

wherein the determining of the respective second operation state information based on the respective first operation state information comprises:

sending, by the processor of the terminal, the respective first operation state information to the one or more target devices, respectively, to configure, based on the respective first operation state information, one or more operation parameters respectively for the one or more target devices to obtain the respective second operation state information;

wherein the operations further comprise: after sending the respective first operation state information to the one or more target devices, respectively, to configure the one or more operation parameters respectively for the one or more target devices, receiving, by the processor of the terminal, result information fed back by the one or more target devices in the second scene, to determine whether the one or more operation parameters respectively for the one or more target devices have been successfully configured based on the respective first operation state information;

in response to determining that the one or more operation parameters respectively for the one or more target devices have been successfully configured, sending, by the processor of the terminal, a control instruction to turn off the one or more devices to be switched in the first scene.

8. The terminal of claim 7, wherein the determining of whether the user moves from the first scene to the second scene comprises:

obtaining respective first position information of one or more first devices that are turned on in the first scene and respective second position information of the one or more target devices in the second scene; and determining whether the respective first position information is at least partially different from the respective second position information, to determine whether the user moves from the first scene to the second scene.

9. The terminal of claim 7, wherein the acquiring of the voiceprint information of the user in the second scene comprises:
upon receiving one or more scene switching instructions, acquiring the voiceprint information of the user in the second scene.

10. The terminal of claim 7, wherein the operations further comprise: before determining whether the user moves from the first scene to the second scene,
obtaining a device turning-on instruction in the first scene, and obtaining voiceprint information in the first scene based on the device turning-on instruction; and
associating the voiceprint information in the first scene with the first scene.

11. The terminal of claim 9, wherein
the one or more scene switching instructions comprise a plurality of scene switching instructions;
the acquiring of the voiceprint information of the user in the second scene upon receiving the one or more scene switching instructions comprises:
upon receiving the plurality of scene switching instructions, obtaining respective first voiceprint information corresponding to the plurality of scene switching instructions;
comparing the respective first voiceprint information with target voiceprint information, to determine a piece of voiceprint information of the respective first voiceprint information matching the target voiceprint information as second voiceprint information;
determining one of the plurality of scene switching instructions corresponding to the second voiceprint information as a target scene switching instruction, and determining a user corresponding to the target scene switching instruction as a target user; and
acquiring voiceprint information of the target user as the voiceprint information of the user in the second scene.

12. The terminal of claim 7, wherein the operations further comprise: after comparing the respective first device information with the respective second device information to determine, as the one or more devices to be switched, the one or more of the one or more first devices,
in response to determining that the one or more devices to be switched comprise a first video play device, obtaining play content and play progress of the video play device; and
sending the play content and the play progress to a second video play device in the second scene, to enable the second video play device to display the play content according to the play progress.

13. A terminal storing thereon a computer program executable by a processor to perform operations comprising:
determining, by a processor of the terminal, whether a user moves from a first scene to a second scene;
in response to determining that the user moves from the first scene to the second scene, acquiring, by the processor of the terminal, voiceprint information of the user in the second scene;
determining, by the processor of the terminal, based on the voiceprint information in the second scene, one or more devices to be switched in the first scene, and obtaining, by the processor of the terminal, respective first operation state information of the one or more devices to be switched; and
determining, by the processor of the terminal, respective second operation state information of one or more target devices in the second scene based on the respective first operation state information,
wherein the one or more target devices match the one or more devices to be switched, respectively;
wherein the determining of the one or more devices to be switched comprises:
obtaining, by the processor of the terminal, respective first device information of one or more first devices that are turned on in the first scene and respective second device information of the one or more target devices in the second scene; and
in response to determining that voiceprint information in the first scene matches the voiceprint information in the second scene, comparing, by the processor of the terminal, the respective first device information with the respective second device information to determine, as the one or more devices to be switched, one or more of the one or more first devices respectively matching the one or more target devices in terms of device information;
wherein the determining of the respective second operation state information based on the respective first operation state information comprises:
sending, by the processor of the terminal, the respective first operation state information to the one or more target devices, respectively, to configure, based on the respective first operation state information, one or more operation parameters respectively for the one or more target devices to obtain the respective second operation state information;
wherein the operations further comprise: after sending the respective first operation state information to the one or more target devices, respectively, to configure the one or more operation parameters respectively for the one or more target devices,
receiving, by the processor of the terminal, result information fed back by the one or more target devices in the second scene, to determine whether the one or more operation parameters respectively for the one or more target devices have been successfully configured based on the respective first operation state information;
in response to determining that the one or more operation parameters respectively for the one or more target devices have been successfully configured, sending, by the processor of the terminal, a control instruction to turn off the one or more devices to be switched in the first scene.

* * * * *